(12) United States Patent
Miyazaki et al.

(10) Patent No.: US 11,156,857 B2
(45) Date of Patent: Oct. 26, 2021

(54) OPTICAL MODULATOR AND OPTICAL TRANSMISSION APPARATUS USING SAME

(71) Applicant: SUMITOMO OSAKA CEMENT CO., LTD, Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/961,413

(22) PCT Filed: Jan. 11, 2019

(86) PCT No.: PCT/JP2019/000695
§ 371 (c)(1),
(2) Date: Jul. 10, 2020

(87) PCT Pub. No.: WO2019/139123
PCT Pub. Date: Jul. 18, 2019

(65) Prior Publication Data
US 2020/0379278 A1   Dec. 3, 2020

(30) Foreign Application Priority Data

Jan. 12, 2018 (JP) .............................. JP2018-003442

(51) Int. Cl.
*G02F 1/035* (2006.01)
*G02F 1/05* (2006.01)
(Continued)

(52) U.S. Cl.
CPC ............ *G02F 1/035* (2013.01); *G02F 1/0508* (2013.01); *G02F 1/0553* (2013.01); *G02F 1/136281* (2021.01)

(58) Field of Classification Search
None
See application file for complete search history.

(56) References Cited

U.S. PATENT DOCUMENTS

2003/0123818 A1* 7/2003 Watanabe .............. H05K 1/141
385/92
2018/0255641 A1* 9/2018 Shirasaki .............. H01L 23/045
(Continued)

FOREIGN PATENT DOCUMENTS

| JP | 2003-258363 | 9/2003 |
|---|---|---|
| JP | 2014-178383 | 9/2014 |
| JP | 2017-134131 | 8/2017 |

OTHER PUBLICATIONS

International Search Report, dated Apr. 2, 2019 (Apr. 2, 2019), 1 page.

*Primary Examiner* — Michael Stahl
(74) *Attorney, Agent, or Firm* — Rankin, Hill & Clark LLP

(57) ABSTRACT

An initial change and a secular change in an optical characteristic and a high frequency characteristic in a case where an optical modulator is mounted in a package of an optical transmission apparatus are suppressed while improving a space utilization rate in the package of the optical transmission apparatus. An optical modulator that is electrically connected to an electric circuit configured on a circuit board, includes a package that houses an optical modulation element, in which the package has, on a bottom surface facing the circuit board, a plurality of first protruding bodies protruding from the bottom surface.

7 Claims, 8 Drawing Sheets

(51) Int. Cl.
G02F 1/055 (2006.01)
G02F 1/1362 (2006.01)

(56) References Cited

U.S. PATENT DOCUMENTS

| 2020/0174205 A1* | 6/2020 | Kubo | H01L 23/49838 |
| 2020/0379279 A1* | 12/2020 | Miyazaki | G02F 1/2252 |
| 2021/0026217 A1* | 1/2021 | Miyazaki | G02F 1/2255 |

* cited by examiner

OPTICAL MODULATOR AND OPTICAL TRANSMISSION APPARATUS USING SAME

TECHNICAL FIELD

The present invention relates to an optical modulator and an optical transmission apparatus using the optical modulator.

BACKGROUND ART

In recent years, a digital coherent transmission technique, which has been started to be applied to long-distance optical communication, is also being applied to metro optical communication such as medium-distance and short-distance due to a further increase in communication demand. In such digital coherent transmission, a DP-QPSK (Dual Polarization-Quadrature Phase Shift Keying) modulator using a LiNbO3 (hereinafter referred to as LN) substrate is typically used as an optical modulator. Hereinafter, an optical modulator using a LiNbO3 substrate will be referred to as an LN modulator.

Such an optical modulator is used, for example, as an optical transmission apparatus to which a driver element (or a drive circuit) that outputs an electric signal for causing the optical modulator to perform a modulation operation is connected. Further, generally, the optical modulator or the driver element is disposed on a circuit board.

In particular, with regard to optical transmission apparatus for short-distance applications such as optical communication for metropolitan, there is a strong demand for a reduction of an installation space for an optical modulator, a driver circuit, or the like, and downsizing of a modulator or the like is desired. In order to downsize the optical modulator, efforts such as downsizing of an LN optical modulation element (for example, a reduction of an optical waveguide disposition area on an LN substrate), downsizing of a space optical system for optically coupling output light from an optical waveguide on an LN substrate to an output optical fiber, and downsizing of a radio frequency (RF) signal input interface of an LN modulator (for example, a change from a coaxial connector to a flexible printed board) have been performed in the related art.

Further, in addition to the downsizing of the optical modulator alone as described above, in order to improve a space utilization rate in an optical transmission apparatus, it has been considered to provide a cutout in a package of the optical modulator and dispose electronic components of the driver circuit in a space secured by the cutout (refer to, for example, Patent Literature No. 1).

However, according to the knowledge of the inventors of the present invention, if an optical modulator of the related art having a cutout provided in a package is fixed to a circuit board in an optical transmission apparatus with screws, after the screw fixation, a problem such as deterioration of an optical characteristic such as light passage loss of the optical modulator, or fluctuation (deterioration) over time of the optical characteristic may occur.

Further, in addition to the change or deterioration of the optical characteristic as described above, a problem of a change or deterioration of a high frequency characteristic of the optical modulator may occur.

The causes of these problems are considered to be the occurrence of processing distortion due to the cutout provided in the package of the optical modulator (for example, the occurrence of a processing deformation portion that reduces the flatness of the bottom surface of the package), and stress concentration on the processing distortion that occurs when the package is fixed with screws.

That is, in the case of a configuration in which a cutout is provided in a part of a package of an optical modulator in order to secure a space for disposition of electric components, as in the optical modulator described in Patent Literature No. 1, for example, processing distortion (also referred to as package distortion) may occur in the package during a cutting process for forming the cutout, or the like. Then, in a case where the package in which such processing distortion has occurred is fixed to the circuit board with screws, minute deformation may occur in the package depending on the state of the processing distortion, the magnitude of a fastening force at the time of the screw fixation, and the like. Further, if a high-frequency driver IC or the like, which generates heat, is disposed in the cutout portion, a heating element can be disposed in the immediate vicinity of the package, and thus the package distortion can be further increased. Further, if the package is maintained in a high temperature state as the optical transmission apparatus operates for a long period of time, the above-mentioned package distortion or minute deformation can expand over time.

Then, the minute deformation that has occurred in the package causes deformation of the LN substrate housed in the package, or a change in the positional relationship between optical components such as lenses that configures the space optical system, and causes a problem of deterioration of the optical characteristic of the optical modulator. Further, in addition to this, the minute deformation of the package also changes the connection state between a radio frequency connector and a circuit board, which may cause deterioration of optical transmission characteristics, for example, in a configuration in which the radio frequency connector is rigidly provided in the package, as in the optical modulator disclosed in Patent Literature No. 1.

On the other hand, it is difficult to sufficiently suppress the occurrence of the processing distortion of the optical modulator package described above, or the change in the stress balance that occurs when the package is fixed to the circuit board with screws, only by devising the processing conditions when performing the cutout processing, the manufacturing conditions in the assembly process when fixing the optical modulator to the circuit board with screws, or the like (for example, reducing variation in processing conditions).

CITATION LIST

Patent Literature

[Patent Literature No. 1] Japanese Laid-open Patent Publication No. 2017-134131

SUMMARY OF INVENTION

Technical Problem

From the above background, an object of the present invention is to suppress an initial change and a secular change in optical characteristic and high frequency characteristic in a case where an optical modulator is mounted in an optical transmission apparatus, while improving a space utilization rate in the optical transmission apparatus.

Solution to Problem

According to an aspect of the present invention, there is provided an optical modulator that is electrically connected to an electric circuit configured on a circuit board, the optical modulator including: a package that houses an optical modulation element, in which the package has, on a bottom surface facing the circuit board, a plurality of first protruding bodies protruding from the bottom surface.

According to another aspect of the present invention, the optical modulator further includes a signal input part that inputs an electric signal for causing the optical modulation element to perform a modulation operation from the electric circuit, in which the package has a second protruding body protruding from the bottom surface, and the signal input part is provided on an upper surface of the second protruding body.

According to another aspect of the present invention, the first protruding body and the second protruding body have the same height from the bottom surface.

According to another aspect of the present invention, the first protruding body and the second protruding body have different heights from the bottom surface.

According to another aspect of the present invention, the plurality of first protruding bodies are disposed on the bottom surface so as to be substantially symmetrical with respect to a line parallel to a longitudinal direction of the package.

According to another aspect of the present invention, the first protruding body is a fixing body that fixes the package to the circuit board.

According to another aspect of the present invention, the package has, on the bottom surface, a plurality of third protruding bodies each having the same height as the first protruding body.

According to another aspect of the present invention, there is provided an optical transmission apparatus including: the optical modulator according to anyone of the above aspects; and a driver element that outputs an electric signal for causing the optical modulator to perform a modulation operation.

This specification includes all the contents of Japanese Patent Application No. 2018-3442 filed on Jan. 12, 2018.

DESCRIPTION OF EMBODIMENTS

Hereinafter, embodiments of the present invention will be described with reference to the drawings.

First Embodiment

Figure 1:
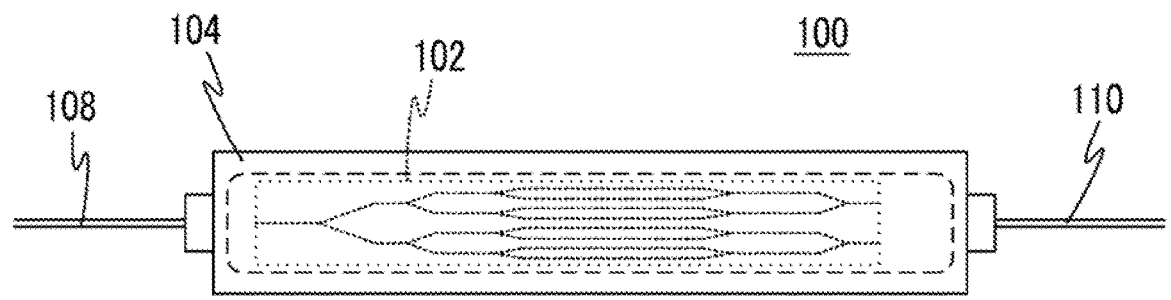
FIG. 1 is a plan view of an optical modulator according to a first embodiment of the present invention.
Figure 2:
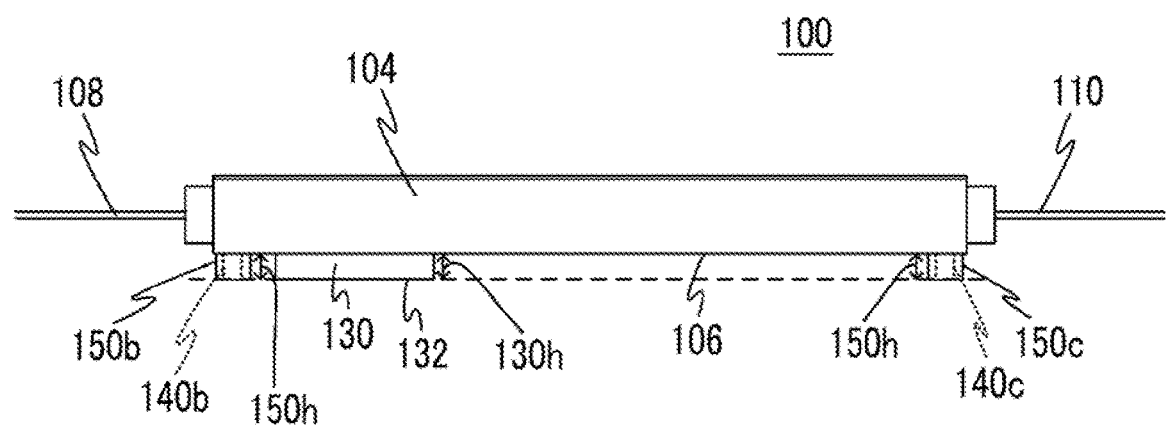
FIG. 2 is a side view of the optical modulator according to the first embodiment of the present invention.
Figure 3:
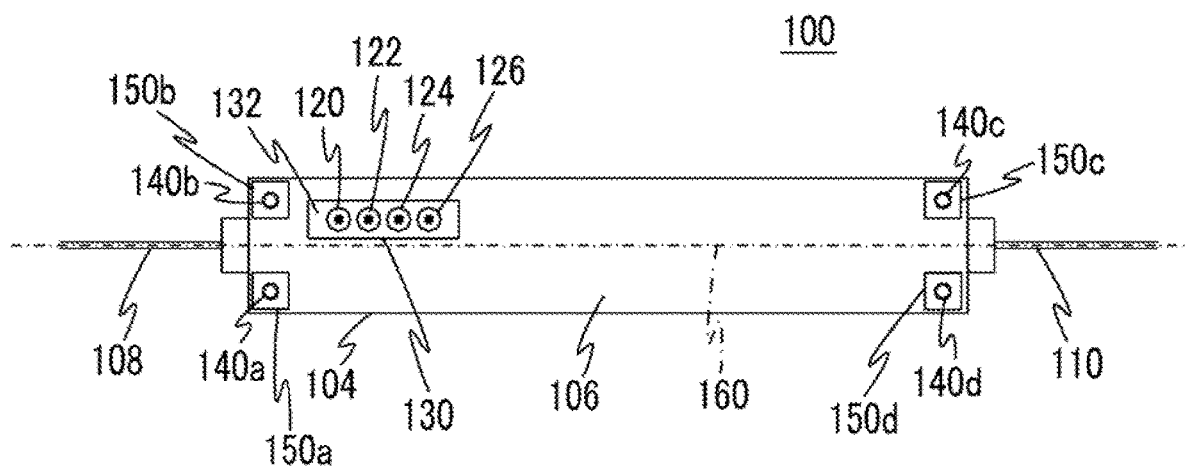
FIG. 3 is a bottom view of the optical modulator according to the first embodiment of the present invention.

First, an optical modulator according to a first embodiment of the present invention will be described. FIG. 1 is a plan view showing the configuration of an optical modulator 100 according to the first embodiment of the present invention, FIG. 2 is a side view of the optical modulator 100, and FIG. 3 is a bottom view of the optical modulator 100. The optical modulator 100 is mounted on, for example, an external circuit board (for example, a circuit board 404 shown in FIG. 4 described later) on which an electric circuit for causing the optical modulator 100 to perform modulation is configured, and used by being electrically connected to the electric circuit.

The optical modulator 100 includes an optical modulation element 102, a package 104 that houses the optical modulation element 102, an optical fiber 108 for inputting light to the optical modulation element 102, and an optical fiber 110 that leads the light that is output from the optical modulation element 102 to the outside of the package 104.

The optical modulation element 102 is an optical modulation element that is used in a DP-QPSK optical modulator or the like, which includes four Mach-Zehnder type optical waveguides provided on an LN substrate, for example, and four radio frequency electrodes (RF electrodes) respectively provided on the Mach-Zehnder type optical waveguides and modulating light waves propagating in the optical waveguides. The two lights that are output from the optical modulation element 102 are polarization-combined by, for example, a lens optical system (not shown) housed in the package 104, and led to the outside of the package 104 through the optical fiber 110.

In the optical modulator 100 of this embodiment, in a region in which a protruding body 130 is not provided, and which is apart of a bottom surface 106 of the package 104, which faces a circuit board on which the optical modulator 100 is mounted, protruding bodies 150a, 150b, 150c, and 150d that are first protruding bodies protruding from the bottom surface 106 are provided. The protruding bodies 150a, 150b, 150c, and 150d are respectively provided at four corners of the bottom surface 106 so as to be substantially symmetrical with respect to a center line 160 (line) extending parallel to a longitudinal direction of the package 104. It is suitable in terms of the balance of fixing stress that the protruding bodies 150a, 150b, 150c, and 150d are respectively provided at the four corners of the bottom surface 106. However, the protruding bodies 150a, 150b, 150c, and 150d may not be symmetrically disposed depending on the disposition of electronic components on the circuit board.

A screw hole 140a is formed in the protruding body 150a, a screw hole 140b is formed in the protruding body 150b, a screw hole 140c is formed in the protruding body 150c, and a screw hole 140d is formed in the protruding body 150d.

Further, the package 104 includes four socket electrodes 120, 122, 124, and 126 respectively connected to the four RF electrodes (not shown) that the optical modulation element 102 has. The socket electrodes 120, 122, 124, and 126 configure female type radio frequency connectors (RF connectors), and corresponding four signal pins provided on an external circuit board are inserted into the socket electrodes, whereby an electric signal (radio frequency signal) from an electric circuit configured on the external circuit board is input thereto.

That is, the socket electrodes 120, 122, 124, and 126 are equivalent to signal input parts for inputting an electric signal for causing the optical modulation element 102 to perform a modulation operation from the electric circuit configured on the external circuit board.

In this embodiment, the signal input part is described as a female socket type electrode. However, it may be a male type or may be a type having a signal pin extending from the package 104.

Further, the protruding body 130 that is a second protruding body protruding from the bottom surface 106 is provided in a region where the protruding bodies 150a, 150b, 150c, and 150d are not provided, on the bottom surface 106 of the package 104 (FIGS. 2 and 3). Then, the socket electrodes 120, 122, 124, and 126, which are signal input parts, are provided on an upper surface (top surface) 132 of the protruding body 130.

In this embodiment, a height 150h of each of the protruding bodies 150a, 150b, 150c, and 150d from the bottom surface 106 is equal to a height 130h of the protruding body 130 from the bottom surface 106.

Figure 4:
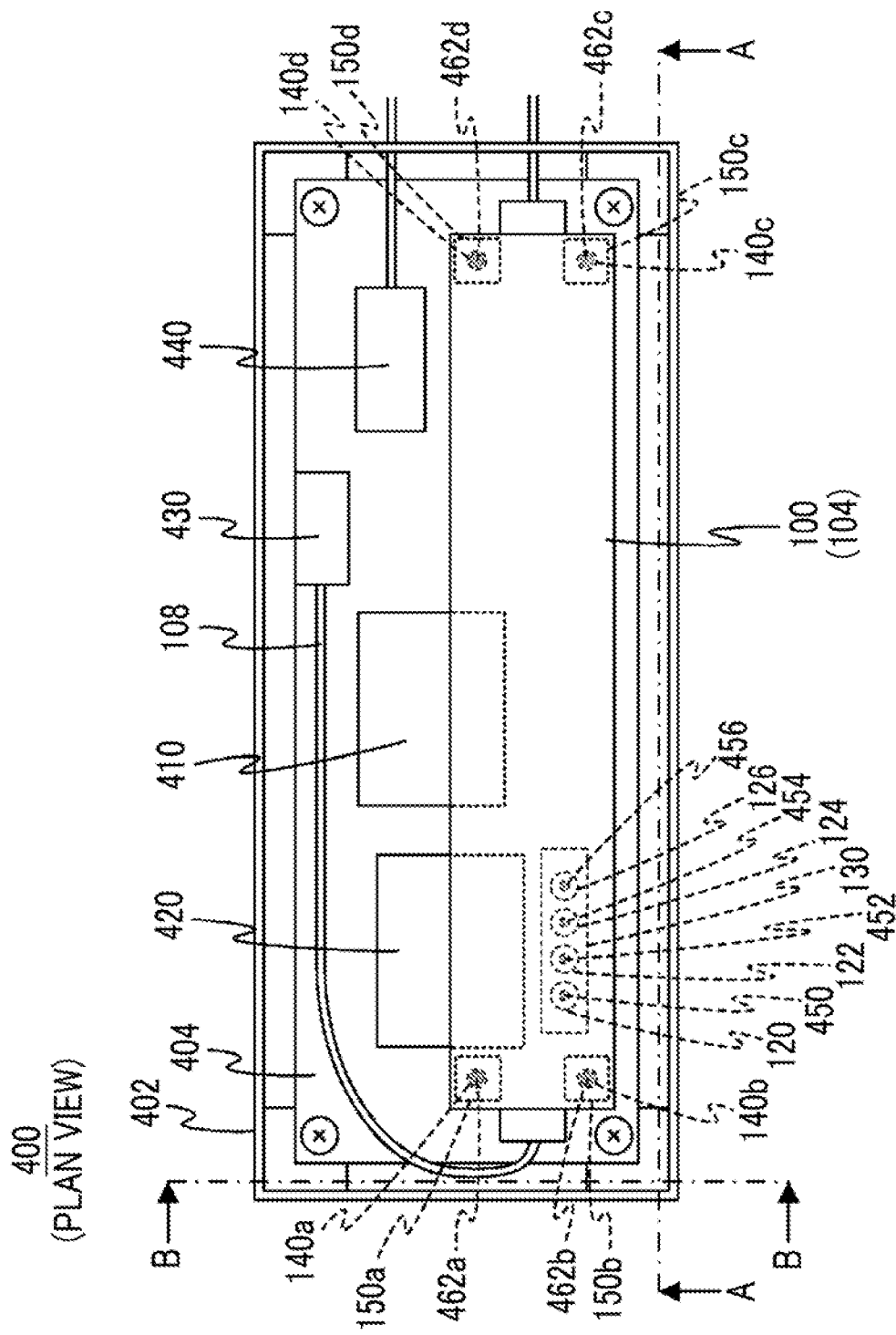
FIG. 4 is a plan view of an optical transmission apparatus in which the optical modulator according to the first embodiment of the present invention is mounted.

Next, an example of mounting the optical modulator 100 on the external circuit board will be described. FIG. 4 is a plan view of an optical transmission apparatus 400 in which the optical modulator 100 is mounted. Further, FIGS. 5 and 6 respectively are sectional views taken along line A-A and line B-B and viewed in the direction of an arrow, of the optical transmission apparatus shown in FIG. 4.

The optical transmission apparatus 400 includes a circuit board 404 fixed inside a package 402, and the optical modulator 100 is mounted on the circuit board 404. Since the optical modulator 100 and the circuit board 404 are housed in the package 402, the optical modulator 100 and the circuit board 404 cannot be visually recognized from the outside of the package 402. However, in FIG. 4, for description, portions housed in the package 402 are also shown by using solid lines, except for the portion of the circuit board 404 hidden by the package 104 of the optical modulator 100.

A DSP (Digital Signal Processor) 410, a DRV (Driver) 420, an LD (Laser Diode) 430, a PD (Photo Diode) 440, and other electronic components (not shown) are mounted on the circuit board 404. The DSP 410 is an arithmetic processing device for executing processing of digital signals. The DRV 420 that is a driver element is an electric circuit for driving the optical modulator 100. The LD 430 inputs laser light to the optical modulator 100 through the optical fiber 108. The PD 440 is installed for receiving a digital coherent optical signal. The electric components mounted on the circuit board 404 are examples, and other electric components other than the above may be mounted.

Figure 5:
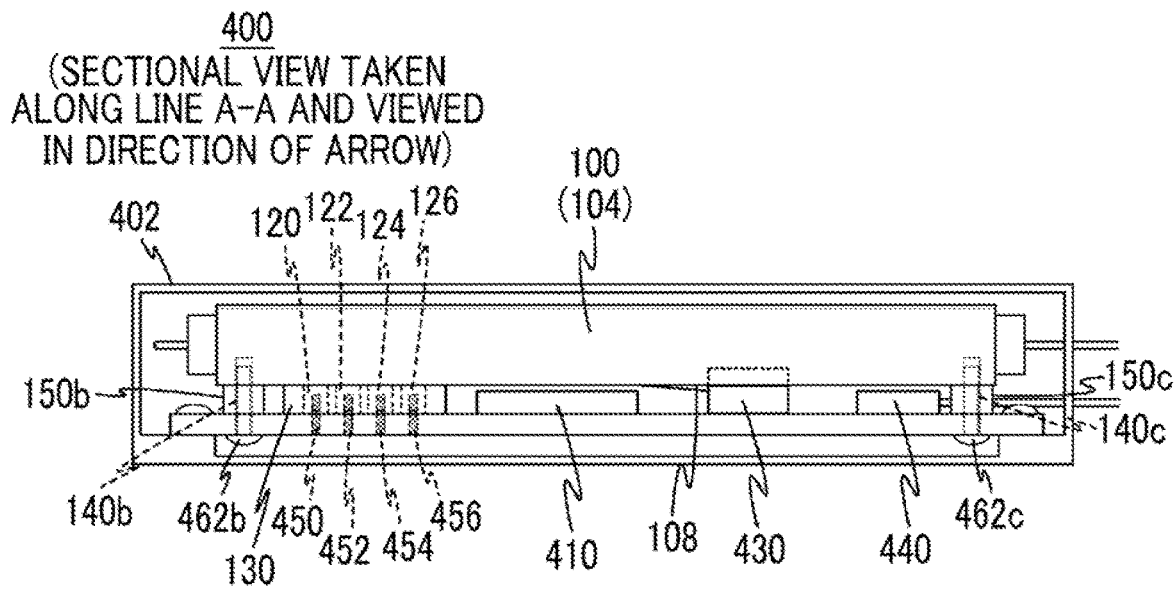
FIG. 5 is a sectional view taken along line A-A and viewed in the direction of an arrow, of the optical transmission apparatus shown in FIG. 4.

The output of the DRV 420 is output from electrode pins 450, 452, 454, and 456 provided on the circuit board 404. The electrode pins 450, 452, 454, and 456 are provided on the circuit board 404 so as to extend to stand upward (in the drawing) from the component mounting surface (upper surface in the drawing) of the circuit board 404, as shown in FIG. 5, from a conductor pattern for signal output of the DRV 420 mounted on the circuit board 404. The socket electrodes 120, 122, 124, and 126 provided in the protruding body 130 are fitted to the electrode pins 450, 452, 454, and 456 provided on the circuit board 404, whereby the optical modulator 100 is electrically connected to the DRV 420.

Further, the screw holes 140a, 140b, 140c, and 140d of the protruding bodies 150a, 150b, 150c, and 150d are fastened to screws 462a, 462b, 462c, and 462d inserted into the circuit board 404, whereby the optical modulator 100 is fixed to the circuit board 404. That is, the protruding bodies 150a, 150b, 150c, and 150d correspond to fixing bodies that fix the package 104 to the circuit board 404.

In this manner, due to the protruding bodies 150a, 150b, 150c, and 150d, a mounting space for electric components such as the DSP 410 or the DRV 420 is secured between the bottom surface 106 of the optical modulator 100 and the circuit board 404. In this way, a space utilization rate in the package 402 of the optical transmission apparatus 400 is improved.

In particular, the bottom surface 106 of the package 140 of the optical modulator 100 according to this embodiment is not provided with a cutout as in the related art, and the protruding bodies 150a, 150b, 150c, and 150d are provided at a part thereof. Therefore, in the optical modulator 100, most of the areas of the bottom surface 106 of the package 104 can be configured as a uniform plane. Here, the protruding bodies 150a, 150b, 150c, and 150d can be provided on the bottom surface 106 only in a region of the minimum area necessary for the fixing of the optical modulator 100 to the circuit board 404. Therefore, disturbance of the uniformity of the bottom surface 106 due to the protruding bodies 150a, 150b, 150c, and 150d can be minimized.

As a result, in the optical modulator 100, the occurrence of the processing distortion of the package 104 is minimized, whereby it is possible to suppress the occurrence of minute deformation of the package 104 in a case where the optical modulator 100 is fixed onto the circuit board 404 of the optical transmission apparatus 400, and suppress an initial change in the optical characteristic of the optical modulator 100 and a secular change in the optical characteristic due to a secular change in deformation stress.

Further, in the optical modulator 100, the socket electrodes 120, 122, 124, are 126, which are signal input parts to which an electric signal (radio frequency signal) for causing the optical modulator 100 to perform an optical modulation operation is input, are provided on the upper surface (top surface) 132 of the protruding body 130 protruding from the bottom surface 106 of the package 104. For this reason, in the optical modulator 100, the electrode pins 450, 452, 454, and 456 standing from the conductor pattern for signal output of a drive circuit configured on the circuit board 404 respectively are in contact with and electrically connected to the socket electrodes 120, 122, 124, and 126 of the optical modulator 100, in the immediate vicinity of the corresponding conductor pattern.

That is, in the optical modulator 100, the distance between the conductor pattern for signal output of the drive circuit configured on the circuit board 404 and the signal input part (socket electrode 120 or the like) of the optical modulator 100 (therefore, the propagation distance of the radio frequency signal which is output from the drive circuit) can be significantly reduced compared to an optical modulator of the related art (for example, the optical modulator disclosed in Patent Literature No. 1). Therefore, the deformation when the package is fixed can also be made small between the conductor pattern and the signal input part, the disturbance of the high frequency characteristic can be reduced, and the initial change and the secular change in the high frequency characteristic can also be suppressed.

As described above, in this embodiment, the height 150*h* of each of the protruding bodies 150*a*, 150*b*, 150*c*, and 150*d* is equal to the height 130*h* of the protruding body 130. In this way, in the optical modulator 100, the upper surface (top surface) of each of the protruding bodies 150*a*, 150*b*, 150*c*, and 150*d* and the upper surface 132 of the protruding body 130 can be formed on the same plane. Therefore, when the screws 462*a*, 462*b*, 462*c*, and 462*d* are fastened, it is possible to suppress the generation of stress on the package 104 by the protruding bodies 150*a*, 150*b*, 150*c*, and 150*d* and the protruding body 130 and to suppress an initial change and a secular change in the optical characteristic of the optical modulator 100 and the high frequency characteristic in the optical modulator 100. Further, when the screws 462*a*, 462*b*, 462*c*, and 462*d* are fastened, the protruding body 130 can be stably provided between the circuit board 404 and the optical modulator 100 without being tilted or distorted, and it is possible to suppress the initial change and the secular change in the high frequency characteristic of the protruding body 130.

Further, the heights 150*h* of the protruding bodies 150*a*, 150*b*, 150*c*, and 150*d* are respectively provided at the four corners of the bottom surface 106 so as to be substantially symmetrical with respect to the center line 160 (line) extending parallel to the longitudinal direction of the package 1004. In this way, the package 104 can be stably fixed to the circuit board 404, and the occurrence of minute deformation in the package 104 of the optical modulator 100 when the optical modulator 100 is fixed onto the circuit board 404 can be further suppressed. Therefore, in the optical modulator 100, it is possible to further suppress the initial change and the secular change in the optical characteristic and the high frequency characteristic in the optical modulator 100 when the optical modulator 100 is mounted on the circuit board 404.

In this embodiment, the protruding bodies 150*a*, 150*b*, 150*c*, and 150*d* are provided at the four corners of the bottom surface 106, which are the portions other than the portion of the bottom surface 106, where the protruding body 130 is provided. However, there is no limitation thereto. With respect to the number and disposition of the protruding bodies 150*a*, 150*b*, 150*c*, and 150*d* which are provided in the portions other than the portion of the bottom surface 106, where the protruding body 130 is provided, any number of the plurality and any disposition can be adopted as long as the mounting space for electric components can be secured between the bottom surface 106 and the circuit board 404 and the initial change and the secular change in the optical characteristic and the high frequency characteristic in a case where the optical modulator 100 is mounted in a package 402 of the optical transmission apparatus 400 can be suppressed.

Second Embodiment

Figure 7:
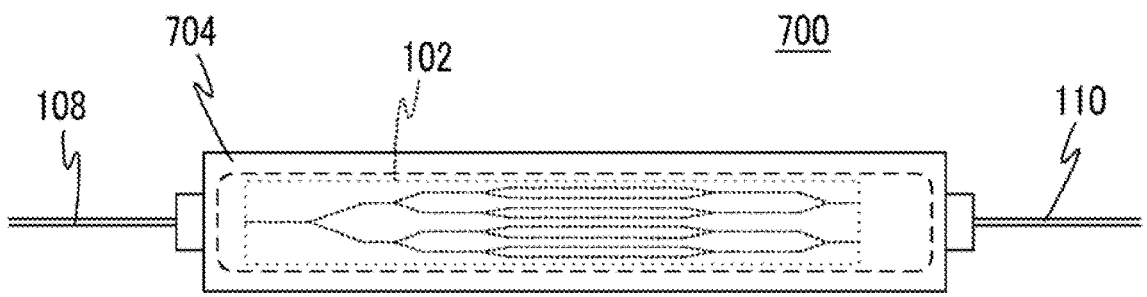
FIG. 7 is a plan view of an optical modulator according to a second embodiment of the present invention.
Figure 8:
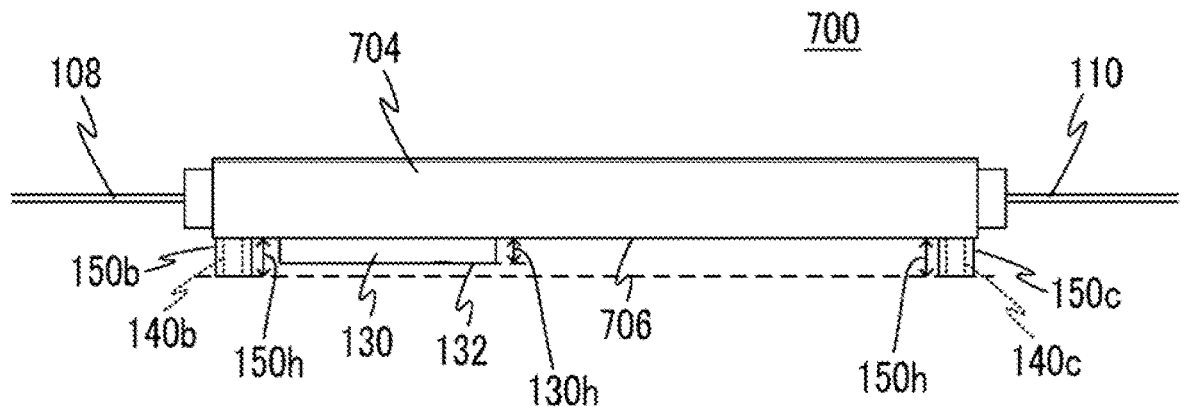
FIG. 8 is a side view of the optical modulator according to the second embodiment of the present invention.

Next, an optical modulator according to a second embodiment of the present invention will be described. FIGS. 7 and 8 respectively are a plan view and a side view showing the configuration of an optical modulator 700 according to the second embodiment of the present invention, and respectively correspond to FIGS. 1 and 2 showing the configuration of the optical modulator 100 according to the first embodiment. In FIGS. 7 and 8, with respect to the same components as those of the optical modulator 100 shown in FIGS. 1 and 2, the description with respect to FIGS. 1 and 2 described above is incorporated herein.

The optical modulator 700 according to the second embodiment has the same configuration as the optical modulator 100 according to the first embodiment, except that the optical modulator 700 has a package 704 instead of the package 104. The package 704 has the same configuration as the package 104, except that the heights 150*h* of the protruding bodies 150*a*, 150*b*, 150*c*, and 150*d* are lower than the height 130*h* of the protruding body 130. The heights 150*h* of the protruding bodies 150*a*, 150*b*, 150*c*, and 150*d* are the same.

In this way, in the optical modulator 700, when the screws 462*a*, 462*b*, 462*c*, and 462*d* are fastened, the protruding body 130 and the circuit board 404 do not come into contact with each other, and therefore, it is possible to prevent uneven stress or additional stress from being applied to the package 104. Therefore, it is possible to suppress the initial change and the secular change in the optical characteristic of the optical modulator 100 and the high frequency characteristic in the optical modulator 100. Further, when the screws 462*a*, 462*b*, 462*c*, and 462*d* are fastened, the protruding body 130 can be stably provided between the circuit board 404 and the optical modulator 100 without being tilted or distorted, and the initial change and the secular change in the high frequency characteristic of the protruding body 130 can also be suppressed.

Third Embodiment

Figure 9:
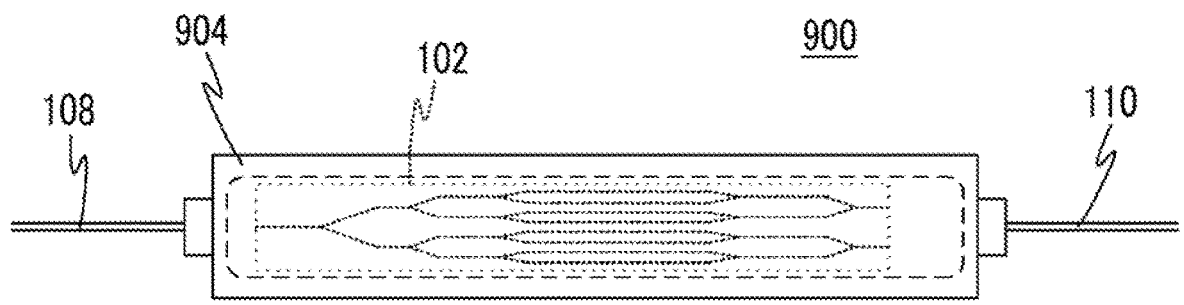
FIG. 9 is a plan view of an optical modulator according to a third embodiment of the present invention.
Figure 10:
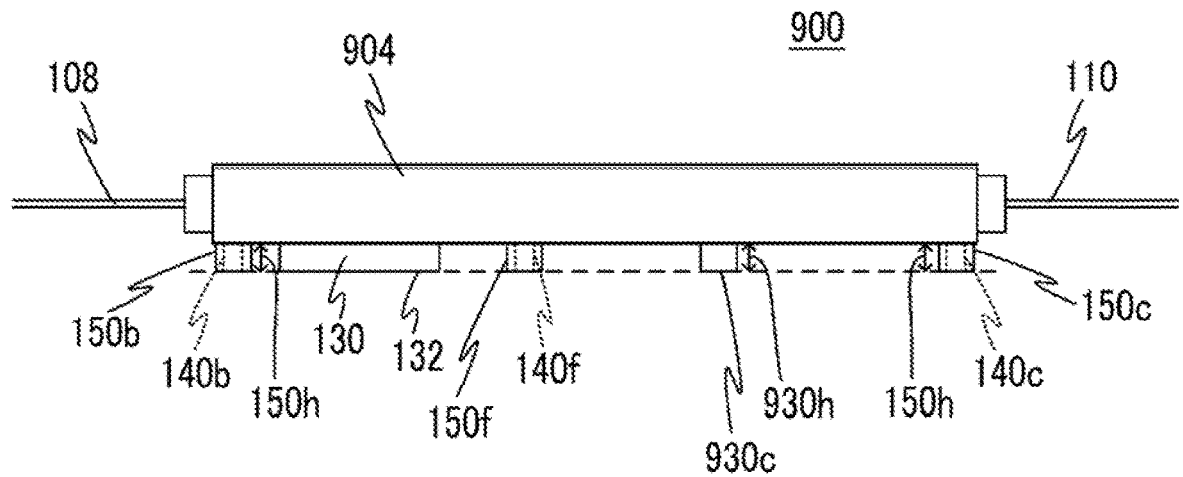
FIG. 10 is a side view of the optical modulator according to the third embodiment of the present invention.
Figure 11:
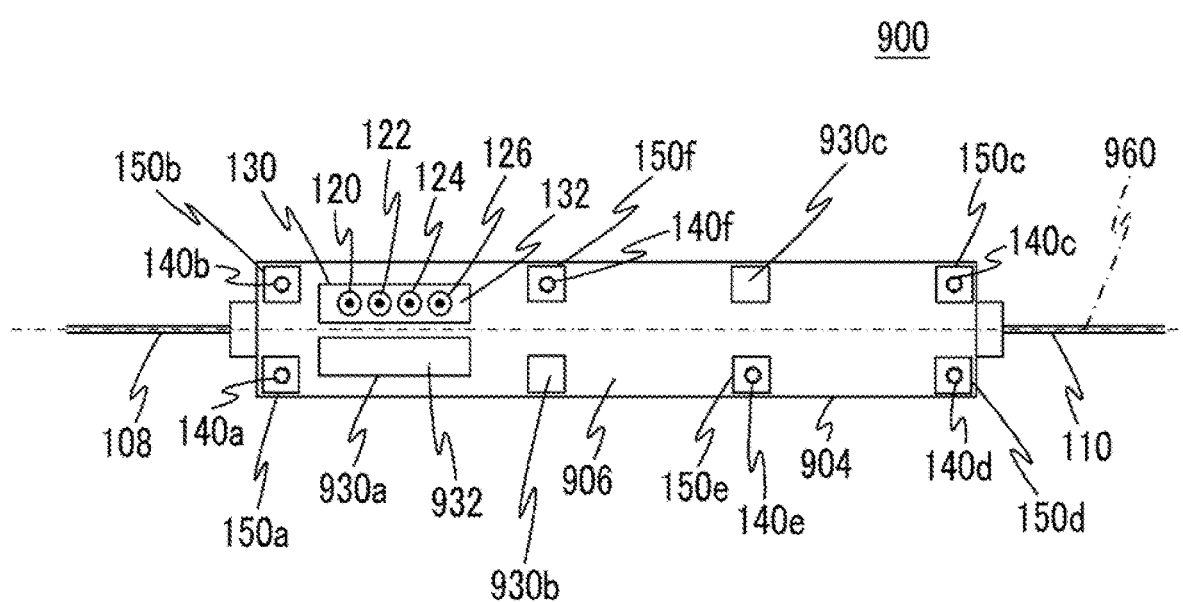
FIG. 11 is a bottom view of the optical modulator according to the third embodiment of the present invention.

Next, an optical modulator according to a third embodiment of the present invention will be described. FIGS. 9, 10, and 11 respectively are a plan view, a side view, and a bottom view showing the configuration of an optical modulator 900 according to the third embodiment of the present invention, and respectively correspond to FIGS. 1, 2, and 3 showing the configuration of the optical modulator 100 according to the first embodiment.

In FIGS. 9, 10, and 11, with respect to the same components as those of the optical modulator 100 shown in FIGS. 1, 2, and 3, the description with respect to FIGS. 1, 2, and 3 described above is incorporated herein.

The optical modulator 900 according to the third embodiment has the same configuration as the optical modulator 100 according to the first embodiment, except that the optical modulator 900 has a package 904 instead of the package 104. The package 904 has the same configuration as the package 104, except that the package 904 further includes protruding bodies 150*e* and 150*f* which are first protruding bodies, in addition to the protruding body 130 and the protruding bodies 150*a*, 150*b*, 150*c*, and 150*d*. Further, the package 904 is different in that it further includes protruding bodies 930*a*, 930*b*, and 930*c* that are third protruding bodies.

The protruding bodies 150*e* and 150*f* are first protruding bodies configured to protrude from a part of the bottom surface 906 of the package 904, similarly to the protruding bodies 150*a*, 150*b*, 150*c*, and 150*d* that are the first protruding bodies. The height of each of the protruding bodies 150*e* and 150*f* from the bottom surface 906 is equal to the height 150*h* of each of the protruding bodies 150*a*, 150*b*, 150*c*, and 150*d*.

A screw hole 140*e* is formed in the protruding body 150*e*, and a screw hole 140*f* is formed in the protruding body 150*f*.

Then, when the optical modulator 900 is mounted on the circuit board, screws are fastened in the screw holes 140e and 140f, like the screw holes 140a, 140b, 140c, and 140d. In this way, the package 904 is fixed to the circuit board. Therefore, the protruding bodies 150e and 150f also correspond to the fixing bodies.

The protruding bodies 150e and 150f are provided closer to the center of the bottom surface 906 than any of the protruding bodies 150a, 150b, 150c, and 150f. In this way, it is possible to further suppress the occurrence of minute deformation of the package 904 when fixing the optical modulator 900 onto the circuit board. Therefore, in the optical modulator 900, it is possible to suppress the initial change and the secular change in the optical characteristic and/or the high frequency characteristic at the time of mounting on the circuit board.

The protruding bodies 930a, 930b, and 930c are third protruding bodies configured to protrude from a part of the bottom surface 906 of the package 904, like the protruding bodies 150a, 150b, 150c, and 150f that are the first protruding bodies. A height 930h of each of the protruding bodies 930a, 930b, and 930c from the bottom surface 906 is equal to at least the height 150h of each of the protruding bodies 150a, 150b, 150c, and 150f. In this way, in the optical modulator 900, due to the presence of the protruding bodies 930a, 930b, and 930c that are the third protruding bodies, the facing areas (for example, the contact area) of the optical modulator 900 and the circuit board are expanded, and thus the optical modulator 900 can be more stably mounted on the circuit board.

In particular, in this embodiment, as shown in FIG. 11, the protruding body 930a is provided at a position symmetrical to the protruding body 130 that is the second protruding body with respect to a center line 960 (line) extending in the longitudinal direction of the package 904. Further, the protruding body 930b is provided at a position substantially symmetrical to the protruding body 150f which is the first protruding body with respect to the center line 960. Further, the protruding body 930c is provided at a position substantially symmetrical to the protruding body 150e that is the first protruding body with respect to the center line 960. In this manner, the package 904 has a symmetrical structure, whereby uneven distribution of the processing distortion of the package 904, which occurs during processing of the package 904, is further reduced as compared with the case of the packages 104 and 704. As a result, it is possible to further suppress the occurrence of minute deformation due to the uneven distribution of the processing distortion in the package 904 of the optical modulator 900 when fixing the optical modulator 900 onto the circuit board. Therefore, in the optical modulator 900, it is possible to suppress the initial change and the secular change in the optical characteristic and/or the high frequency characteristic at the time of mounting on the circuit board.

Further, in general, in a DP-QPSK modulator which is an example of an optical modulator to which the configuration of the optical modulator 100, 700, or 900 can be applied, a configuration is made such that two output lights from the optical modulation element 102 propagate along the center line 160 or 960 parallel to the longitudinal direction of the package 104, 704, or 904 and in a symmetrical disposition with respect to the center line 160 or 960. Then, an optical element such as a lens for combining the two output lights and leading the combined light to the optical fiber 108 is often disposed symmetrically with respect to the center line 960 parallel to the longitudinal direction of the package 904.

Therefore, if the package 104, 704, or 904 has a symmetric structure, as in this embodiment, so that shape changes that can occur in the package become symmetrical with respect to the center line 160 or 960, the secular change in optical characteristic or the temperature change in the optical modulator 100, 700, or 900 can be more effectively suppressed compared to a case where these packages have an asymmetric structure.

In this embodiment, the configuration is made in which the upper surface 132 of the protruding body 130 and the upper surface 932 of the protruding body 930 are not provided with screw holes. However, there is no limitation thereto. For example, the upper surface 132 and/or the upper surface 932 may be provided with at least one screw hole, and the protruding body 130 and/or the protruding body 930 may be fastened to the circuit board with screws. In this way, the distance between the conductor pattern for signal output of the drive circuit configured on the circuit board and the signal input part (socket electrode 120 or the like) of the optical modulator 900 is more stably maintained, and thus the secular change in the high frequency characteristic of the optical modulator 900 can be suppressed even better.

Fourth Embodiment

Figure 12:
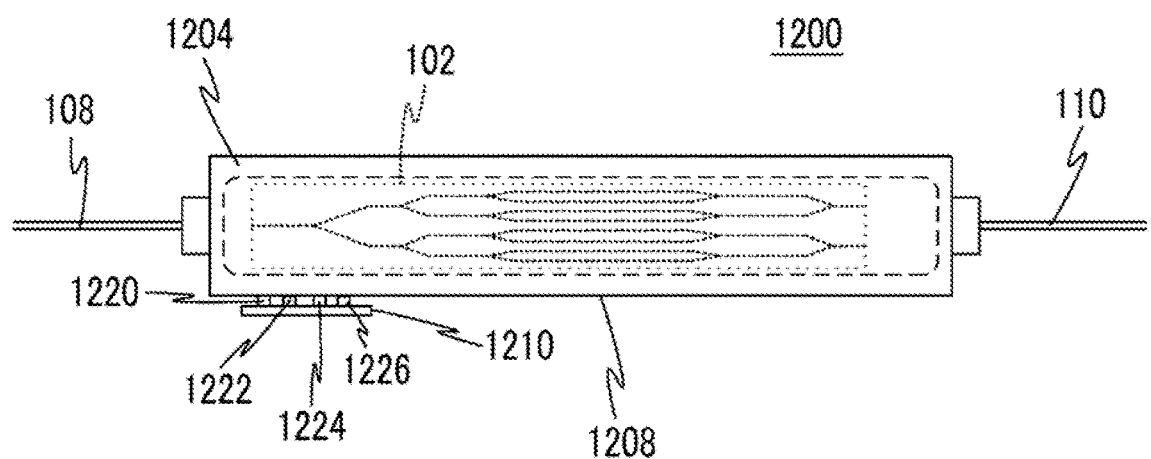
FIG. 12 is a plan view of an optical modulator according to a fourth embodiment of the present invention.
Figure 13:
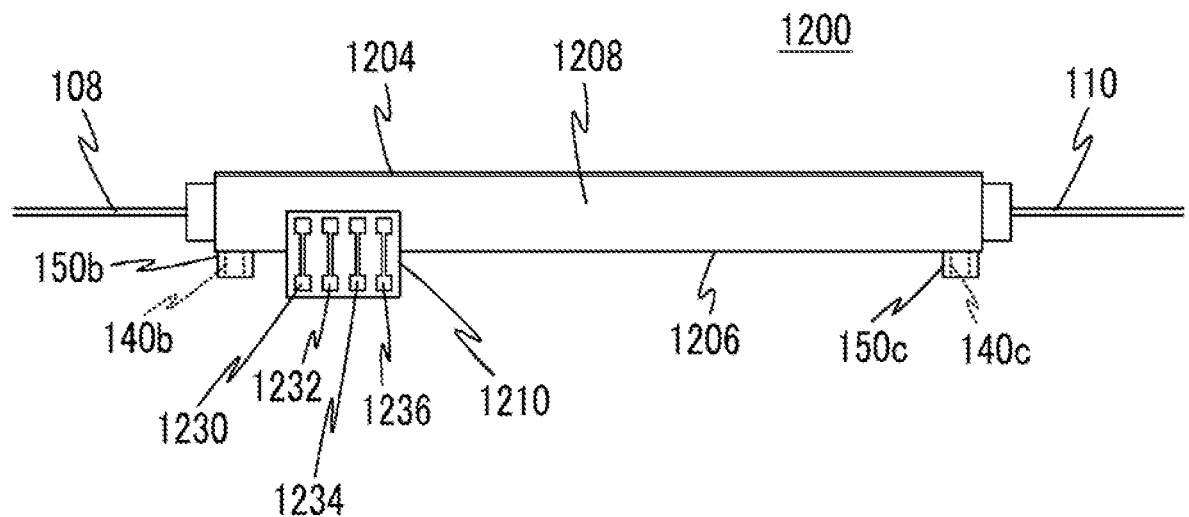
FIG. 13 is a side view of the optical modulator according to the fourth embodiment of the present invention.
Figure 14:
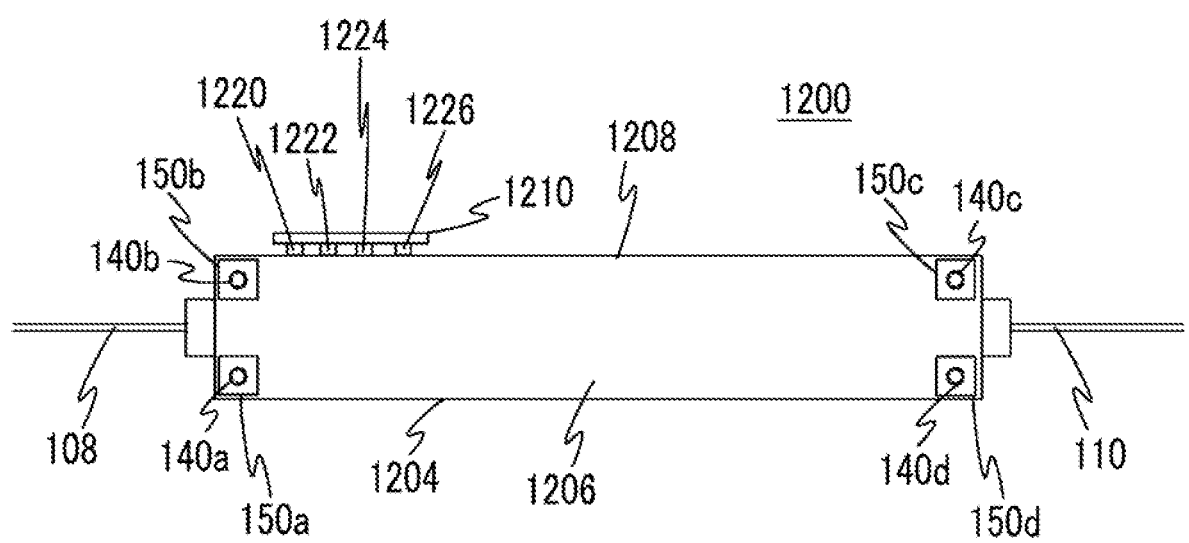
FIG. 14 is a bottom view of the optical modulator according to the fourth embodiment of the present invention.

Next, an optical modulator according to a fourth embodiment of the present invention will be described. FIGS. 12, 13, and 14 respectively are a plan view, a side view, and a bottom view showing the configuration of an optical modulator 1200 according to the fourth embodiment of the present invention, and respectively correspond to FIGS. 1, 2, and 3 showing the configuration of the optical modulator 100 according to the first embodiment.

In FIGS. 12, 13, and 14, with respect to the same components as those of the optical modulator 100 shown in FIGS. 1, 2, and 3, the description with respect to FIGS. 1, 2, and 3 described above is incorporated herein.

The optical modulator 1200 according to the fourth embodiment has the same configuration as the optical modulator 100 according to the first embodiment, except that the optical modulator 1200 has a package 1204 instead of the package 104. The package 1204 has the same configuration as the package 104, except that a bottom surface 1206 is not provided with the protruding body 130 that is the second protruding body and that instead of the protruding body 130, a flexible printed circuit board 1210 is connected to a side surface 1208.

Electrode pins 1220, 1222, 1224, and 1226 are provided on the side surface 1208 of the package 1204 so as to protrude from the side surface 1208. The electrode pins 1220, 1222, 1224, and 1226 are electrically connected to corresponding four signal pins provided on the external circuit board through the flexible printed circuit board 1210, whereby an electric signal (radio frequency signal) from an electric circuit configured on the external circuit board is input. The flexible printed circuit board 1210 is provided with signal lines 1230, 1232, 1234, and 1236 disposed to correspond to at least the electrode pins 1220, 1222, 1224, and 1226, respectively. Then, the signal lines 1230, 1232, 1234, and 1236 of the flexible printed circuit board 1210 are connected to the corresponding electrode pins 1220, 1222, 1224, and 1226 by predetermined connection means.

Figure 15:
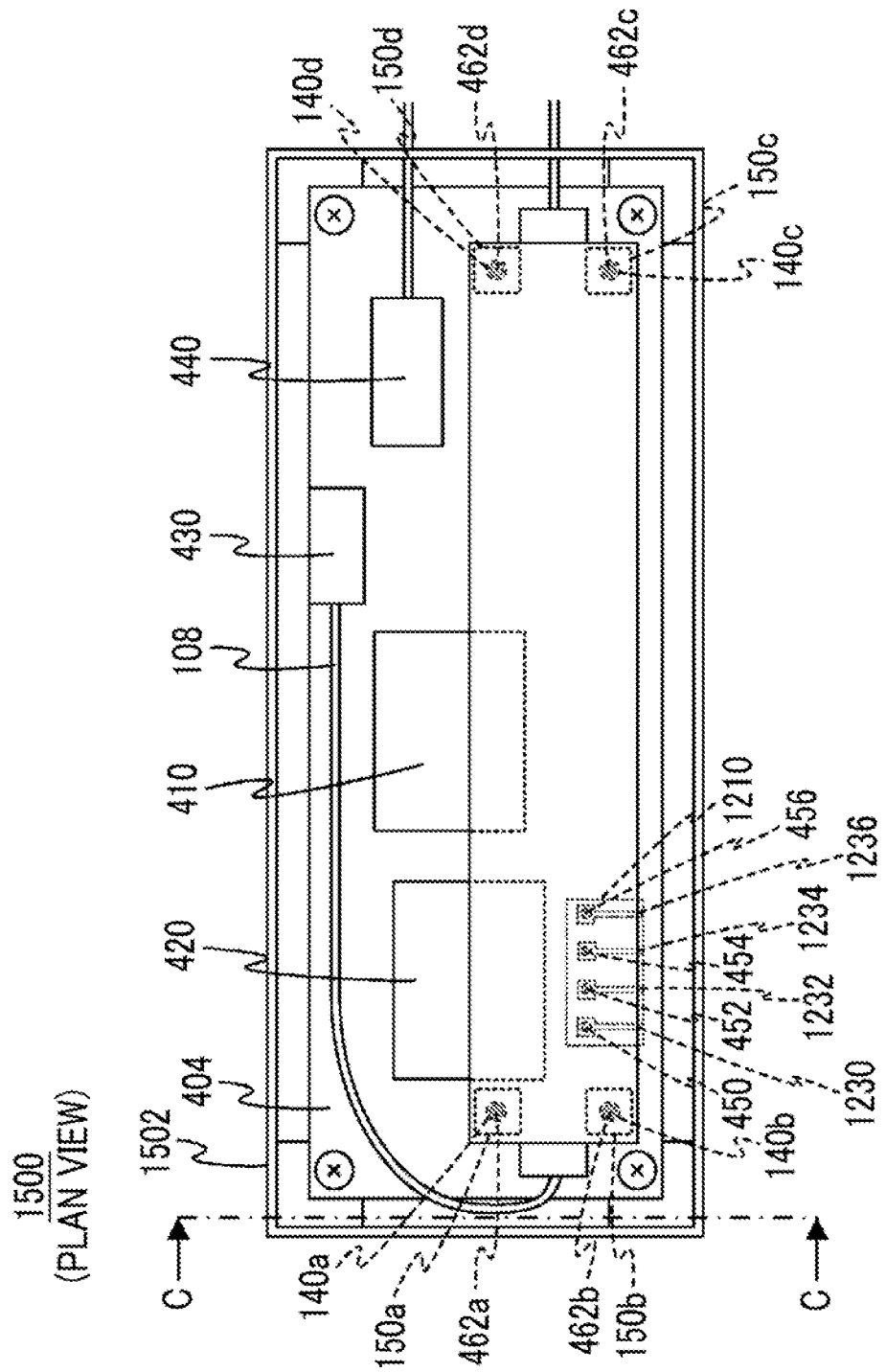
FIG. 15 is a plan view of an optical transmission apparatus in which the optical modulator according to the fourth embodiment of the present invention is mounted.

Next, an example of mounting the optical modulator 1200 of this embodiment on the external circuit board will be described. FIG. 15 is a plan view of an optical transmission apparatus 1500 in which the optical modulator 1200 is mounted. Further, FIG. 16 is a sectional view taken along line C-C and viewed in the direction of an arrow, of the optical transmission apparatus 1500 shown in FIG. 15.

Figure 6:
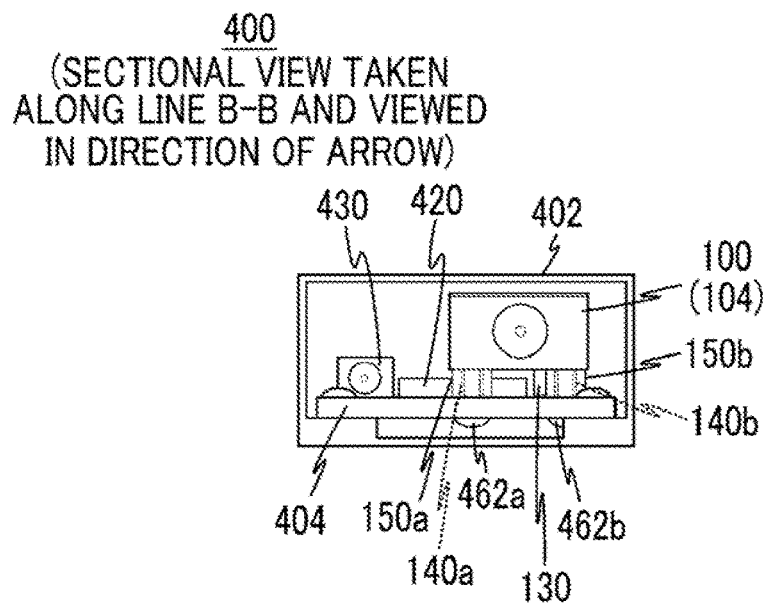
FIG. 6 is a sectional view taken along line B-B and viewed in the direction of an arrow, of the optical transmission apparatus shown in FIG. 4.
Figure 16:
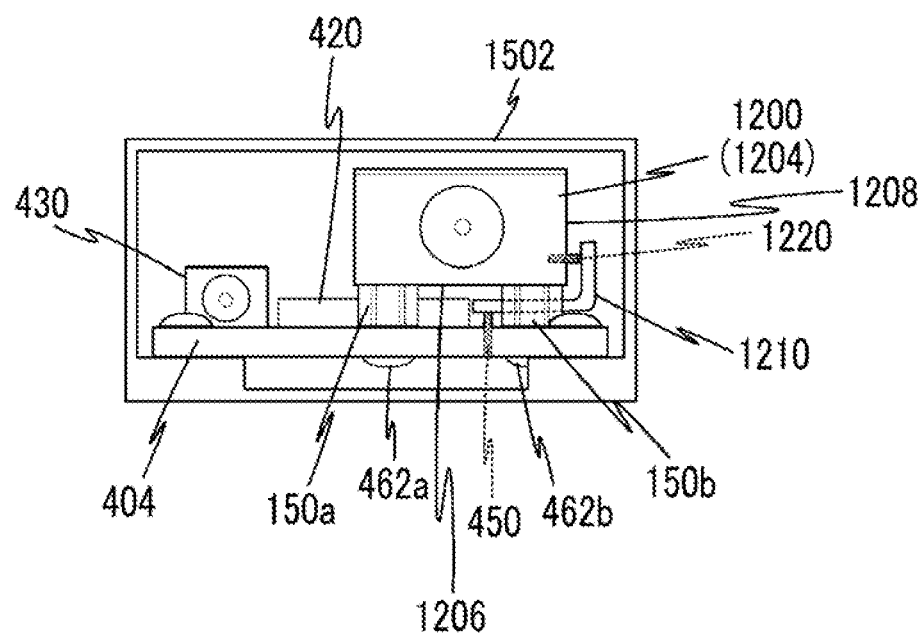
FIG. 16 is a sectional view taken along line C-C and viewed in the direction of an arrow, of the optical transmission apparatus shown in FIG. 15.

In FIGS. 15 and 16, with respect to the same components as those of the optical transmission apparatus 400 shown in FIGS. 4 and 6, the description with respect to FIGS. 4 and 6 described above is incorporated herein.

The optical transmission apparatus 1500 includes the circuit board 404 fixed inside a package 1502, and the optical modulator 1200 is mounted on the circuit board 404. Since the optical modulator 1200 and the circuit board 404 are housed in the package 1502, the optical modulator 1200 and the circuit board 404 cannot be visually recognized from the outside of the package 1502. However, in FIG. 15, for description, portions housed in the package 1502 are also shown by using solid lines, except for the portion of the circuit board 404 hidden by the package 1204 of the optical modulator 1200.

The DSP 410, the DRV 420, the LD 430, the PD 440, and other electronic components (not shown) are mounted on the circuit board 404.

The output of the DRV 420 is output from the electrode pins 450, 452, 454, and 456 provided on the circuit board 404. The flexible printed circuit board 1220 is curved and inserted between the bottom surface 1206 of the package 1204 and the circuit board 404 and the signal lines 1230, 1232, 1234, and 1236 of the flexible printed circuit board 920 are electrically connected to the corresponding electrode pins 450, 452, 454, and 456 by predetermined connection means, whereby the optical modulator 1200 is electrically connected to the DRV 420.

In this manner, even in the configuration in which the electric signal (radio frequency signal) for causing the optical modulator 1200 to perform an optical modulation operation is input from the side surface 1208 of the package 1204, the mounting space for electric components such as the DSP 410 or the DRV 420 is secured between the bottom surface 1206 of the optical modulator 1200 and the circuit board 404 by the protruding bodies 150*a*, 150*b*, 150*c*, and 150*d*. In this way, the space utilization rate in the package 1502 of the optical transmission apparatus 1500 is improved. In particular, in this embodiment, since the bottom surface 1206 of the package 1204 is not provided with the protruding body 130 that is the second protruding body, it is possible to further minimize the disturbance of the uniformity of the bottom surface 1206 due to the protruding body 130.

As a result, in the optical modulator 1200, the occurrence of the processing distortion of the package 1204 is minimized, whereby it is possible to further suppress the occurrence of minute deformation of the package 1204 in a case where the optical modulator 1200 is fixed onto the circuit board 404 of the optical transmission apparatus 1500, and further suppress the initial change and the secular change in the optical characteristic of the optical modulator 1200.

In each of the embodiments described above, from the viewpoint of reducing the processing distortion of the packages 104, 704, 904, and 1204 and securing the mounting space for electric components such as the DSP 410 or the DRV 420, the total area of the first protruding bodies is preferably less than 50% and more preferably 25% or less of the area of the bottom surface 106, 706, 906, or 1206.

In each of the embodiments described above, the optical modulator which includes an optical modulation element having four RF electrodes using LN as a substrate is shown. However, the present invention is not limited to this, and can also be likewise applied to an optical modulator having a number of RF electrodes other than four and/or an optical modulator using a material other than LN as a substrate.

REFERENCE SIGNS LIST

100, 700, 900, 1200: optical modulator
102: optical modulation element
104, 704, 904, 1204: package
106, 706, 906, 1206: bottom surface
108, 110: optical fiber
120, 122, 124, 126: socket electrode
130, 150*a*, 150*b*, 150*c*, 150*d*, 150*e*, 150*f*, 930*a*, 930*b*, 930*c*: protruding body
132, 932: upper surface
140*a*, 140*b*, 140*c*, 140*d*, 140*e*, 140*f*: screw hole
400, 1500: optical transmission apparatus
402, 1502: package
404: circuit board
450, 452, 454, 456, 1220, 1222, 1224, 1226: electrode pin
462*a*, 462*b*, 462*c*, 462*d*: screw
160, 960: center line
1210: flexible printed circuit board
1230, 1232, 1234, 1236: signal line

The invention claimed is:

1. An optical modulator that is electrically connected to an electric circuit configured on a circuit board, the optical modulator comprising:
   a package that houses an optical modulation element; and
   a signal input part that inputs an electric signal for causing the optical modulation element to perform a modulation operation from the electric circuit,
   wherein
   the package has, on a bottom surface facing the circuit board, a plurality of first protruding bodies protruding from the bottom surface, and a second protruding body protruding from the bottom surface,
   the signal input part is provided on an upper surface of the second protruding body, and
   the plurality of first protruding bodies are part of the bottom surface of the package and protrude from the bottom surface.

2. The optical modulator according to claim 1, wherein the first protruding bodies and the second protruding body have the same height from the bottom surface.

3. The optical modulator according to claim 1, wherein the first protruding bodies and the second protruding body have different heights from the bottom surface.

4. The optical modulator according to claim 1, wherein the plurality of first protruding bodies are disposed on the bottom surface so as to be substantially symmetrical with respect to a line parallel to a longitudinal direction of the package.

5. The optical modulator according to claim 1, wherein the first protruding bodies are fixing bodies that fix the package to the circuit board.

6. The optical modulator according to claim 1, wherein the package has, on the bottom surface, a plurality of third protruding bodies each having the same height as the first protruding bodies.

7. An optical transmission apparatus comprising:
   the optical modulator according to claim 1; and
   a driver element that outputs an electric signal for causing the optical modulator to perform a modulation operation.

* * * * *